No. 771,116. PATENTED SEPT. 27, 1904.
H. P. BARNHART.
TROLLING BAIT.
APPLICATION FILED JULY 18, 1903.
NO MODEL.
Fig. 1.
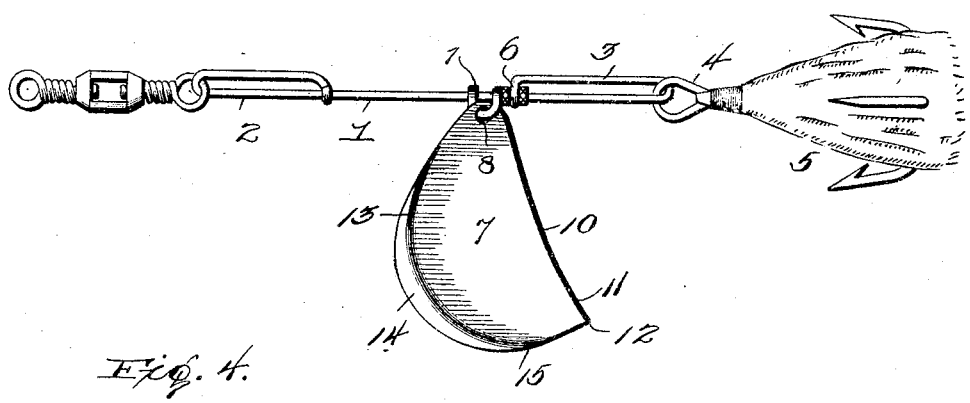
Fig. 4.
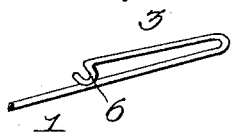
Fig. 2.
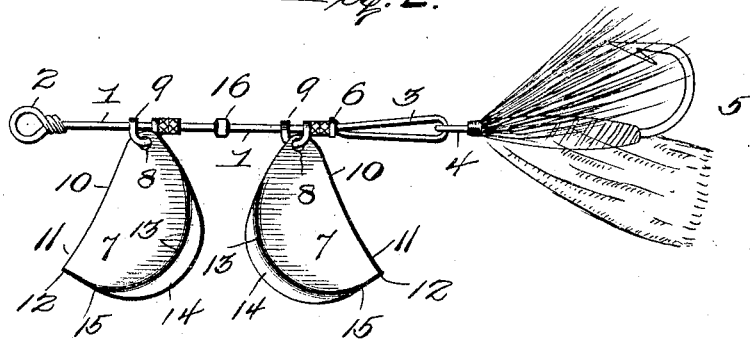
Fig. 3.
Inventor
Henry P. Barnhart,
By William D. Deane
Attorney
Witnesses No. 771,116.

Patented September 27, 1904.

UNITED STATES PATENT OFFICE.

HENRY P. BARNHART, OF LOGANSPORT, INDIANA.

TROLLING-BAIT.

SPECIFICATION forming part of Letters Patent No. 771,116, dated September 27, 1904.

Application filed July 18, 1903. Serial No. 166,181. (No model.)

*To all whom it may concern:*

Be it known that I, HENRY P. BARNHART, a citizen of the United States, residing at Logansport, in the county of Cass and State of Indiana, have invented certain new and useful Improvements in Trolling-Bait, of which the following is a specification.

This invention relates to fishing-tackle, and has special reference to artificial bait of the type generally known in the art as "trolling" baits or spoons.

To this end the invention contemplates an improvement particularly in the shape of the spoon or spoon-blade whereby the latter is made more effective in the use of the tackle or bait. In this connection the invention has in view the provision of a spoon or spoon-blade of peculiar shape which causes the same to spin more freely than the ordinary forms of spoons, besides making more revolutions and spinning swifter than the latter.

A further object is to provide a bait which shall be exceedingly light for fly-casting and embodying a form of spoon which can be made in rights and lefts, whereby the same will spin in the water upon the same principle as a turbine.

Another and general object of the invention is to provide a peculiar formation of spoon which causes a rapid and free spinning thereof, while at the same time reducing to a minimum the friction against the water.

With these and many other objects in view, which will more readily appear as the nature of the invention is better understood, the same consists in the novel construction, combination, and relation of parts, as will be hereinafter more fully described, illustrated, and claimed.

The essential feature of the invention involved in the peculiar shape of the spoon is necessarily susceptible to some modification without departing from the scope of the invention, but preferred embodiments thereof are shown in the drawings, in which—

Figure 1 is an elevation of a trolling-bait embodying a spoon and hook mounting such as contemplated by the present invention. Fig. 2 is a similar view showing the tackle or bait having a pair of spoons constructed in rights and lefts to secure the turbine spinning action referred to. Fig. 3 is a detail cross-sectional view of a spoon, showing the flat formation of the body and the oblique disposition thereto of the flange-fin. Fig. 4 is a detail in perspective of one end of the bait-stem, showing a preferable manner of detachably connecting the hook thereto.

Like reference-numerals designate corresponding parts throughout the several figures of the drawings.

In carrying out the invention the peculiarly-shaped spoon contemplated may be associated in any practical manner with any of the ordinary types of bait stems or shafts, but preferably in connection with a stem embodying means for the ready attachment and detachment of the hook, as shown in the drawings.

Referring particularly to the drawings, the numeral 1 designates a bait stem or shaft consisting of a single length of wire having at one end a loop or eye 2 for connection with the line in any suitable manner and at its other end bent to form a spring-loop 3, detachably receiving the connecting-eye 4 of the masked or artificial bait 5. The spring-loop 3 is formed by bending one end of the stem-wire upon itself, and the free terminal of the said loop is provided with a laterally-deflected fastening-hook 6, adapted to be sprung into engagement with the shank or body of the stem 1 to provide simple and practical means for making the hook 5 readily detachable.

The special feature of the present invention resides in the employment of a trolling-spoon 7 of peculiar form, said spoon being designed to spin or revolve about the stem as the same is trolled through the water. The spoon is provided at one end thereof with the usual eye 8 for connection with the spoon-swivel 9, which loosely slides and turns upon the stem 1 to permit of the spinning action of the spoon in the usual manner; but in the present invention the spoon-body 7 essentially consists of a flat blade or plate in contradistinction to the concavo-convex blades or plates usually employed in the formation of trolling-spoons, and in addition to being of a flat formation throughout the body or blade constituting the spoon may be properly said to be of a "deltoid-ovate" shape, which is a term usually applied to a leaf or similar object having an outline between the shape of a triangle and an egg. The triangular outline of the spoon body or blade is conspicuous, while at the same time the ovate appearance is likewise apparent. This ovate-deltoid spoon body or blade, specifically, is provided with a truncated side 10, having an approximately straight edge curving at one end, as at 11, into the pointed corner or nose 12 at the ovate end of the body, and at the side opposite the truncated side 10 the spoon body or blade is swelled into the ovate semi-egg shape, producing a convexed edge 13, along which the spoon body or blade is provided with an outturned curved flange 14, producing what may be properly termed a "fin," and tapered at its ends 15, so as to merge directly into the flat portion of the body contiguous to the opposite ends thereof. This peculiar formation of spoon causes the same to spin with great freedom and rapidity as it is drawn through the water, and by arranging the same in rights and lefts upon the same stem, as shown in Fig. 2 of the drawings, the same will have a spinning action in the water upon the principle of a turbine. When a pair of ovate-deltoid spoons are employed, a fixed separating-collar 16 is soldered or otherwise permanently secured at an intermediate point upon the stem to prevent entanglement of the spoons during their action.

From the foregoing it is thought that the construction, action, and many advantages of the herein-described trolling-bait will be readily apparent to those familiar with the art, and it will also be understood that changes in the form, proportion, and minor details of construction may be resorted to without departing from the spirit of the invention or sacrificing any of the advantages thereof.

Having thus described the invention, what is claimed, and desired to be secured by Letters Patent, is—

1. A trolling-spoon consisting of a flat blade of deltoid-ovate shape.

2. A trolling-spoon consisting of a flat blade of deltoid-ovate shape and provided at its convexed edge with a flange-fin.

3. A trolling-spoon consisting of a flat blade truncated at one edge and at the opposite edge being convexed and having an outturned flange-pin.

4. A trolling-spoon consisting of a flat blade of deltoid-ovate shape, the same being truncated at one side and curving at one end of the latter into a pointed corner or nose, said blade opposite its truncated side being convexed and provided at the edge thereof with an outturned flange-fin merging at its ends into the flat body contiguous to the ends thereof.

In testimony whereof I affix my signature in presence of two witnesses.

HENRY P. BARNHART.

Witnesses:
  R. D. LEWIS,
  GEO. A. CUSTER.